United States Patent
Enno

(10) Patent No.: US 6,929,323 B2
(45) Date of Patent: Aug. 16, 2005

(54) SEAT

(75) Inventor: Yosuke Enno, Omori-nishi (JP)

(73) Assignee: Minebea Co., Ltd., Kitasaku-gu (JP)

( * ) Notice: Subject to any disclaimer, the term of this patent is extended or adjusted under 35 U.S.C. 154(b) by 0 days.

(21) Appl. No.: 10/076,281

(22) Filed: Feb. 19, 2002

(65) Prior Publication Data

US 2002/0113476 A1 Aug. 22, 2002

(30) Foreign Application Priority Data

Feb. 22, 2001 (JP) ........................................ 2001-046579

(51) Int. Cl.$^7$ ................................................. A47C 1/02
(52) U.S. Cl. ............... 297/217.3; 297/330; 297/423.26; 297/354.11
(58) Field of Search ....................... 297/423.34, 423.26, 297/354.11, 217.3, 362.11, 330; 5/424, 616, 617; 49/28, 27

(56) References Cited

U.S. PATENT DOCUMENTS

| | | | | |
|---|---|---|---|---|
| 4,669,780 A | * | 6/1987 | Sakakibara et al. | ......... 297/257 |
| 4,819,987 A | * | 4/1989 | Stringer | .................. 297/423.35 |
| 5,931,532 A | * | 8/1999 | Kemmerer et al. | ......... 297/330 |
| 6,223,467 B1 | * | 5/2001 | Mahalek et al. | ................ 49/27 |
| 6,267,445 B1 | * | 7/2001 | Marais | .................. 297/423.36 |
| 6,373,005 B1 | * | 4/2002 | Griesbach et al. | ....... 200/61.44 |

* cited by examiner

*Primary Examiner*—Peter M. Cuomo
*Assistant Examiner*—Stephen D'Adamo
(74) *Attorney, Agent, or Firm*—Oliff & Berridge, PLC

(57) ABSTRACT

There is provided a seat preventing the baggage or the like from being damaged. A leg rest strain gauge is provided on the bark surface of the leg rest frame on the proximal side. When a baggage is placed in the operating space of the leg rest in the bed position, and the leg rest is moved downward and is abutted against the baggage, the leg rest warps to form a convex on the upper surface in response to a reaction force from the baggage (a force in the direction opposite to the direction of the inclining movement of the leg rest). Therefore, the leg rest strain gauge expands, and thus the resistance and the gauged voltage value exceed the inclining direction determination value and the stoppage determination value. Consequently, the operation of the motor is stopped and the further downward movement of the leg rest is stopped. Therefore, the leg rest is prevented from pressurizing the baggage unnecessarily, thereby preventing the baggage from being damaged.

2 Claims, 5 Drawing Sheets

(a)

(b)

SEAT

BACKGROUND OF THE INVENTION

1. Field of the Invention

The present invention relates to a seat to be installed in such as the first-class cabin of the aircraft.

2. Description of the Related Art

One example of the conventional seat to be installed in the first-class cabin of the aircraft comprises a seat cushion mounted on the frame supported on the floor so as to move in the fore-and-aft direction, a seatback supported on the rear side of the seat cushion for pivotal movement, a leg rest supported on the front side of the seat cushion for pivotal movement, and a footrest provided in the storage formed in the leg rest so as to appear and disappear (move forward and backward).

The position of such a seat can be changed among the normal position in which the seatback is in the near upright position and the leg rest having the footrest store therein faces downward to the near vertical position, the reclined position in which the seatback is inclined backward (downward), and the leg rest having the footrest stored is inclined forward (upward), and the bed position where the seatback is in the near horizontal position and the leg rest with the footrest pulled out is held in a horizontal position on the level with the footrest. The seat is adapted to be changed in its position by operating the corresponding position-change switches provided on the operating panel. The position is changed in the order of the normal position→the reclined position →the bed position, and in reverse, in the order of the bed position→the reclined position→the normal position.

Incidentally, in the seat described above, the operating range of the seatback and leg rest is significantly large, and thus there may be cases where an item such as a cabin baggage is placed within its operating range. In such a case, when the seatback or the leg rest is inclined downwardly, it may brought into contact with the cabin baggage, and as a consequent, the driving force of the driving means may press or jam the item such as the cabin baggage, which may result in damage of the cabin baggage.

SUMMARY OF THE INVENTION

An object of the present invention is to provide a seat in which damage of the item such as the cabin baggage may be prevented.

The present invention is a seat comprising a seatback and leg rest supported by the seat cushion for pivotal movement, and driving means for driving the seatback and the leg rest, wherein one of the frame provided in the seatback and the frame provided in the leg rest is provided with a strain gauge for detecting, during the inclining movement, a force that acts on the frame in the direction opposite to the direction of the inclining movement.

Preferably, a seat of the present invention further comprises operation-stopping means for bringing the operation of at least one of the seatback and the leg rest, which is provided with the strain gauge, to a stop when a force that the strain gauge detected is larger than the predetermined reference value.

Preferably, a seat of the present invention further comprises alarm means for alarming that a large force is applied on at least one of the seatback and the leg rest, which is provided with the strain gauge therein, when the force that the strain gauge detected is larger than the predetermined reference value.

DESCRIPTION OF THE PREFERRED EMBODIMENTS

Referring now to FIG. 1 to FIG. 5, a seat according to an embodiment of the present invention will be described. The seat 1 is to be installed in the first-class cabin of the aircraft.

Figure 1:
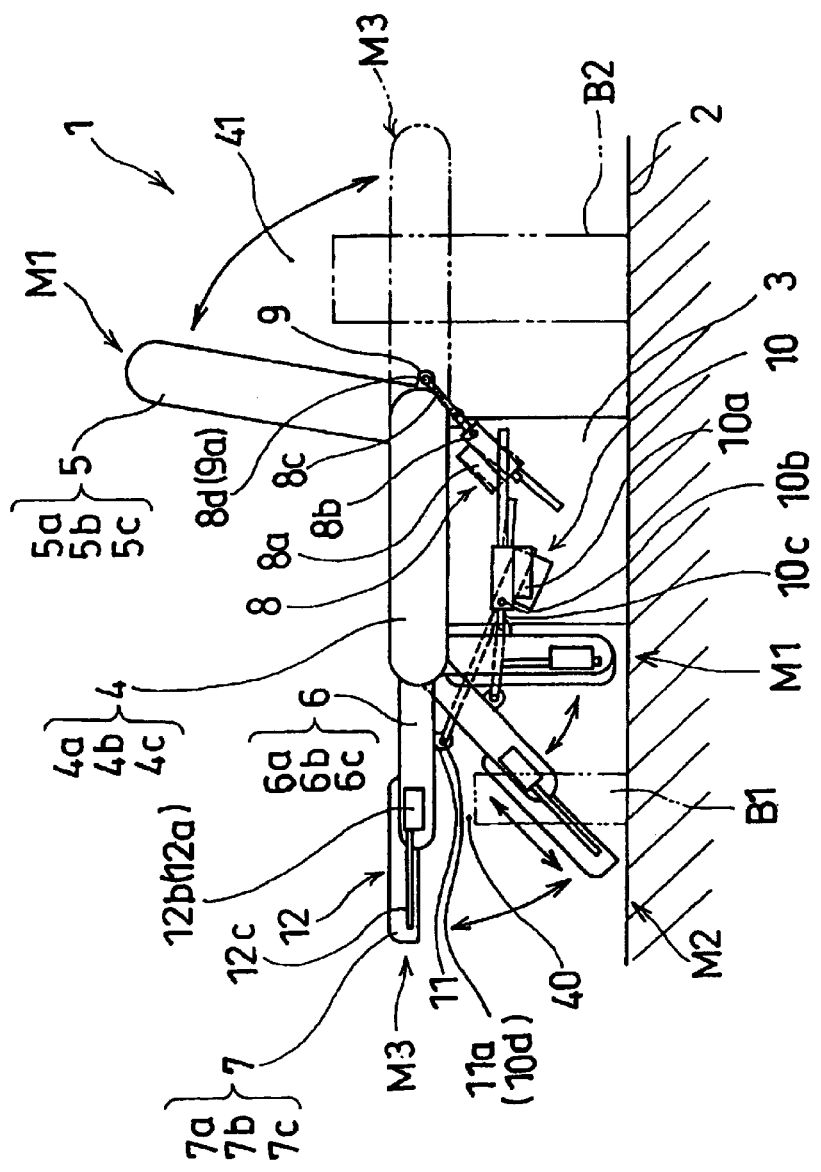
FIG. 1 is a schematic diagram of a seat according to an embodiment of the present invention.
Figure 2:
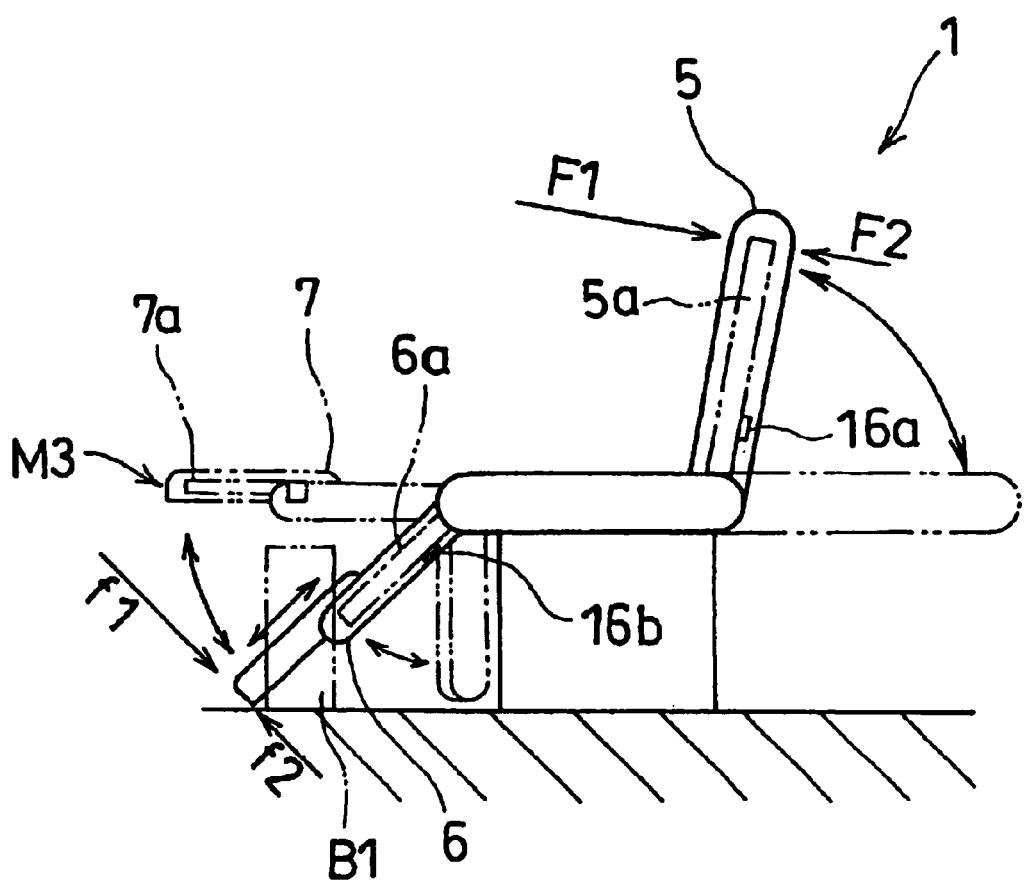
FIG. 2 is an explanatory drawing illustrating how a load is applied to the seat shown in FIG. 1.
Figure 3:
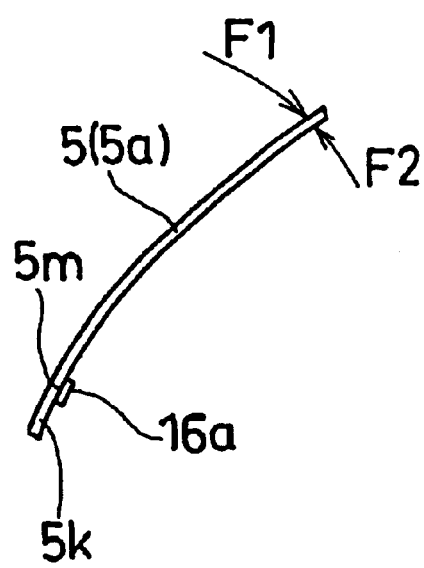
FIG. 3 is a drawing showing the states to be detected by the strain gauge of FIG. 1.
Figure 3:
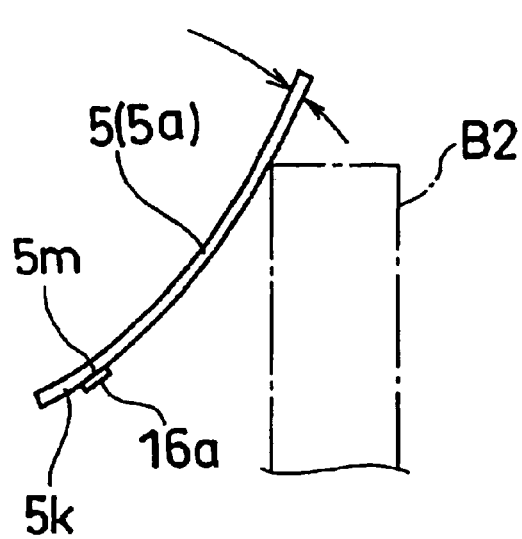

The seat 1 generally comprises, as shown in FIG. 1 to FIG. 3, a main frame 3 to be mounted on the floor 2 of the first-class cabin of the aircraft, a seat cushion 4 supported by the main frame 3 so as to be movable in the fore-and-aft direction, a seatback 5 supported on the rear side of the seat cushion 4 for pivotal movement, a leg rest 6 supported on the front side of the seat cushion 4 for pivotal movement, and a footrest 7 supported by the leg rest 6 so as to move forward and backward in the direction along the leg rest 6, wherein the position can be changed among the normal position M1, the reclined position M2, and the bed position M3 when in use.

The range of pivotal movement of the seatback 5 ranges from the near upright position to the near horizontal position. The range of pivotal movement of the leg rest 6 ranges from the near horizontal position to the near vertical position in which the front edge of the leg rest 6 faces downward. The footrest 7 is shorter than the leg rest 6, and is adapted to be in close agreement with the font edge portion of the leg rest 6 when it is retracted into the leg rest 6 to the maximum extent, as shown in the near vertical state.

The seat cushion 4 generally comprises a seat cushion frame 4a supported by the main frame 3 so as to move in the fore-and-aft direction, a seat cushion body 4b held by the seat cushion frame 4a and having resiliency, and a seat cushion cover 4c for covering the seat cushion body 4b and the seat cushion frame 4a.

The seatback 5 generally comprises a seatback frame 5a supported by the seat cushion frame 4a for pivotal movement, a seatback cushion portion 5b held by the seatback frame 5a and having resiliency, and a seatback cover 5c for covering the seatback cushion portion 5b and the seatback cover 5c.

The leg rest 6 generally comprises a leg rest frame 6a supported by the seat cushion frame 4a for pivotal movement, a leg rest cushion portion 6b held by the leg rest frame 6a and having resiliency, and a leg rest cover 6c for cover the leg rest cushion portion 6b and the leg rest frame 6a.

The footrest 7 generally comprises a footrest frame 7a supported by the leg rest frame 6a so as to move in the fore-and-aft direction, a footrest cushion portion 7b held by the footrest frame 7a and having resiliency, and a footrest cover 7c for coveting the footrest cushion portion 7b and the footrest frame 7a.

A seatback driving mechanism 8 is interposed between the main frame 3 and the seatback frame 5a. The setback driving mechanism 8 comprises a seatback motor 8a constructed of a DC brushless motor, and a power transmission mechanism 8b such as a ball screw or the like actuated by the seatback motor 8a, so that the rotational output of the seatback motor 8a is transmitted to the movable shaft 8c of the seatback power transmission mechanism 8b for rectilinear movement.

The seatback motor 8a and the transmission mechanism 8b for the seatback are jointed and held by the main frame 3 for pivotal movement.

There is provided a shaft 8d on the tip of the movable shaft 8c of the seatback power transmission mechanism 8b, and the shaft 8d is rotatable inserted into the hole 9a on the bracket 9 provided on the seatback frame 5a. When the movable shaft 8c of the seatback power transmission mechanism 8b is moved toward the rear of the seat, the seatback 5 is inclined upward, and when the movable shaft 8c is moved toward the front of the seat, the seatback 5 is inclined downward.

There is provided between the main frame 3 or the seat cushion frame 4a and the seatback 5 a position maintaining mechanism, so that the seatback 5 is supported in a state in which the seatback 5 is inclined to the near horizontal position. The position maintaining mechanism may be provided on the seatback power transmission mechanism 8b.

A leg rest driving mechanism 10 is interposed between the main frame 3 and the leg rest frame 6a. The leg rest driving mechanism 10 comprises a leg rest motor 10a constructed of a DC brushless motor, and a leg rest power transmission mechanism 10b such as a ball screw driven by the leg rest motor 10a so that the rotational output of the leg rest motor 10a is transmitted to the movable shaft 10c of the leg rest power transmission mechanism 10b for rectilinear movement.

The leg rest motor 10a and the leg rest power transmission mechanism 10b are connected and held by the main frame 3 for pivotal movement.

There is provided a shaft 10d on the tip of the movable shaft 10c of the leg rest power transmission mechanism 10b, and the shaft 10d is rotatably inserted in the hole 11a on the bracket 11 provided on the leg rest frame 6a. When the movable shaft 10c of the leg rest power transmission mechanism 10b is moves toward the front of the seat, the leg rest 6 is inclined upward, and when the movable shaft 10c is moved toward the rear of the seat, the leg rest 6 is inclined downward. In this case, the seat cushion 4 is adapted to move forward and backward with the inclining movement of the leg rest 6 by the movement of the movable shaft 10c of the leg rest power transmission mechanism 10b, and the leg rest driving mechanism 10 works also as the seat cushion driving mechanism 4.

There is provided between the main frame 3 and the leg rest 6 a position maintaining mechanism (not shown), so that the leg rest 6 is supported in a state in which the leg rest 6 is inclined to the near horizontal position. The position maintaining mechanism may be provided on the leg rest power transmission mechanism 10b.

A footrest driving mechanism 12 is interposed between the leg rest frame 6a and the footrest frame 7a. The footrest driving mechanism 12 comprises a footrest motor 12a constructed of a DC brushless motor and a footrest power transmission mechanism 12b such as a ball screw driven by the footrest motor 12a so that the rotational output of the footrest motor 12a is transmitted to the movable shaft 12c of the footrest power transmission mechanism 12b for rectilinear movement.

A footrest frame 7a is connected to the tip of the movable shalt 12c of the footrest power transmission mechanism 12b so that the footrest 7 moves forward and backward with the rectilinear movement of the movable shaft 12c. It is also possible to construct the footrest driving mechanism 12 of the linear motor instead of the footrest motor 12a of the rotary type and the footrest power transmission mechanism 12b so that the footrest 7 is moved forward and backward by the linear motor.

The direction of rotation of the respective motors (the seatback motor 8a the leg rest motor 10a and the footrest motor 12a) may be changed by controlling the controller 20, so that the direction of the movement of the movable shafts (8c, 10c, 12c) of the respective driving mechanisms (the seatback driving mechanism 8, the leg rest driving mechanism 10, and the footrest driving mechanism 12) are changed.

The seatback motor 8a is connected to the power supply 23 via a switch controlled by the controller 20 (the seatback switch 21a) so as to be supplied with an electric current. In the same manner, the leg rest motor 10a is connected via a leg rest switch 21b, and the footrest motor 12a is connected via a footrest switch 21c, to the power supply 23, so as to be supplied with an electric current.

An operating panel lies side-by-side with the seat cushion 4 on the left side or the right side thereof. The operating panel includes a changeover switch for the normal position 24a, a changeover switch for the reclined position 24b, and a changeover switch for the bed position 24c.

When any one of the changeover switch for the normal position 24a, the changeover switch for the reclined position 24b, and the changeover switch for the bed position 24c is operated, each motor is actuated to take a position corresponding to the operated switch.

The seat 1 is adapted to be used by changing the positions among the normal position M1, the reclined position M2, and the bed position M3. The positions will now be described. The normal position M1 is a state in which the seatback 5 is in the near upright position, and the leg rest 6 including the footrest 7 stored therein is oriented downward in the near vertical position. The reclined position M2 is a state in which the seatback 5 is inclined rearward (downward), and the leg rest 6 including the footrest 7 stored therein is inclined forward (upward). The bed position M3 is a state in which the seatback 5 is in the near horizontal position, and the leg rest 6 with the footrest 7 pulled out is brought into the near horizontal position on the level with the footrest 7. The position is changed in the order of the normal position M1→the reclined position M2→the bed position M3, and in reverse, in the order of the bed position M3→the reclined position M2→the normal position M1.

On the back surface of the seatback frame 5a (the surface opposite to the front surface, assuming that the surface on the side where the seated person comes into contact is a front surface) on the proximal side, there is provided a strain gauge for detecting a strain generated on the seatback frame 5a (a seatback strain gauge 16a). The seatback strain gauge 16a comprises a strain detecting element formed of metal having such a characteristic that the electric resistance increases when it is expanded and decreases when it is contracted, and outputs the voltage value near proportional to the value of the electric resistance to the controller 20. In this case, when the strain-detecting element is not expanded nor contracted, the voltage value (gauged voltage value) that the seatback strain gauge 16a supplies to the controller 20 is a predetermined voltage value (reference voltage value).

For example, as shown in FIG. 3(a), when the seatback 5 is inclined upward with a seated parson leaned against the seatback 5, and a downward force F1 acts upon the distal side of the seatback 5, the seatback 5 warps to form a convex surface on the upper side with the proximal side 5k as a pivot, and the portion on the back side where the seatback strain gauge 16a is provided (the position where the gauge is mounted) 5m is contracted, so that the value of electrical resistance of the seatback strain gauge 16a is lowered and thus the voltage value supplied to the controller 20 (gauged voltage value) is smaller than the reference voltage value described above.

On the other hand, as shown in FIG. 3(b), when a baggage B2 is placed in the operating space of the seatback 5 (the seatback operating space 41), and the seatback 5 is inclined from the erected state downward and is abutted against the baggage B2 and then an upward force F2 is applied to the distal side of the seatback 5, the seatback 5 warps to form a concave surface on the upper side with the proximal side 5k as a pivot, and the portion where the gauge is mounted 5m is expanded, so that the value of the electrical resistance of the seatback strain gauge 16a increases and thus the gage voltage value is larger than the reference voltage value described above.

Depending on whether the gauged voltage value is smaller or larger than the reference voltage value, the warping state of the seatback 5 (concave or convex on the upper side), and whether the seatback 5 is inclining downward or upward may be determined. The reference voltage value for this determination (hereinafter referred to as an inclining direction determination value) is stored in the controller in advance.

When the gauged voltage value is larger than the inclining direction determination value, it is anticipated that a member such as the baggage B2 is placed in the seatback operation space 41. The controller 20 retains a voltage value that is slightly larger than he inclining direction determination value (stoppage determination value) in the memory for making a determination (determination whether or not a member is placed in the seatback operating space 41 or not).

The seatback strain gauge 16a is, as described above, provided on the rear surface of the seatback frame 5a on the proximal side, so that a reaction force from the baggage or the like (a force in the direction opposite to the direction of the inclining movement of the seatback frame 5a) is detected by the increase in resistance resulting from the expansion of the strain-detecting element of the seatback strain gauge 16a.

While, in this embodiment, the voltage value near proportional to the resistance of the strain detection element is supplied to the controller 20, it may also be constructed in such a manner that a current signal inversely proportional to the resistance of the strain-detecting element is supplied to the controller 20 alternatively.

On the back surface of the leg rest frame 6a on the proximal side, there is provided a strain gauge (a) for detecting a strain generated on the leg rest frame 6a. The leg rest strain gauge 16b has almost the same construction and characteristics as the strain gauge 16a of the seatback, and supplies a voltage value corresponding to the expansion or contraction (gauged voltage value) to the controller 20, and a predetermined magnitude of the voltage value (reference voltage value) is supplied as the gauged voltage value to the controller 20 when the strain-detection element is not expanded nor contracted. The controller 20 retains the reference voltage value for the leg rest 6 in the memory as the inclining direction determination value.

In addition, the controller 20 retains the inclining direction determination value slightly larger than the inclining direction determination value for the leg rest 6 in the memory, so that the determination whether or not the member is placed in the leg rest operating space 40.

The controller 20 is connected to the respective switches (the seatback switch 21a, the leg rest switch 21b, and the footrest switch 21c), the respective detectors (the seatback current detector 22a, the leg rest current detector 22b, and the footrest current detector 22c), and the respective changeover switches (the changeover switch 24a for the normal position, the changeover switch 24b for the reclined position, and the changeover switch 24c for the bed position).

Figure 4:
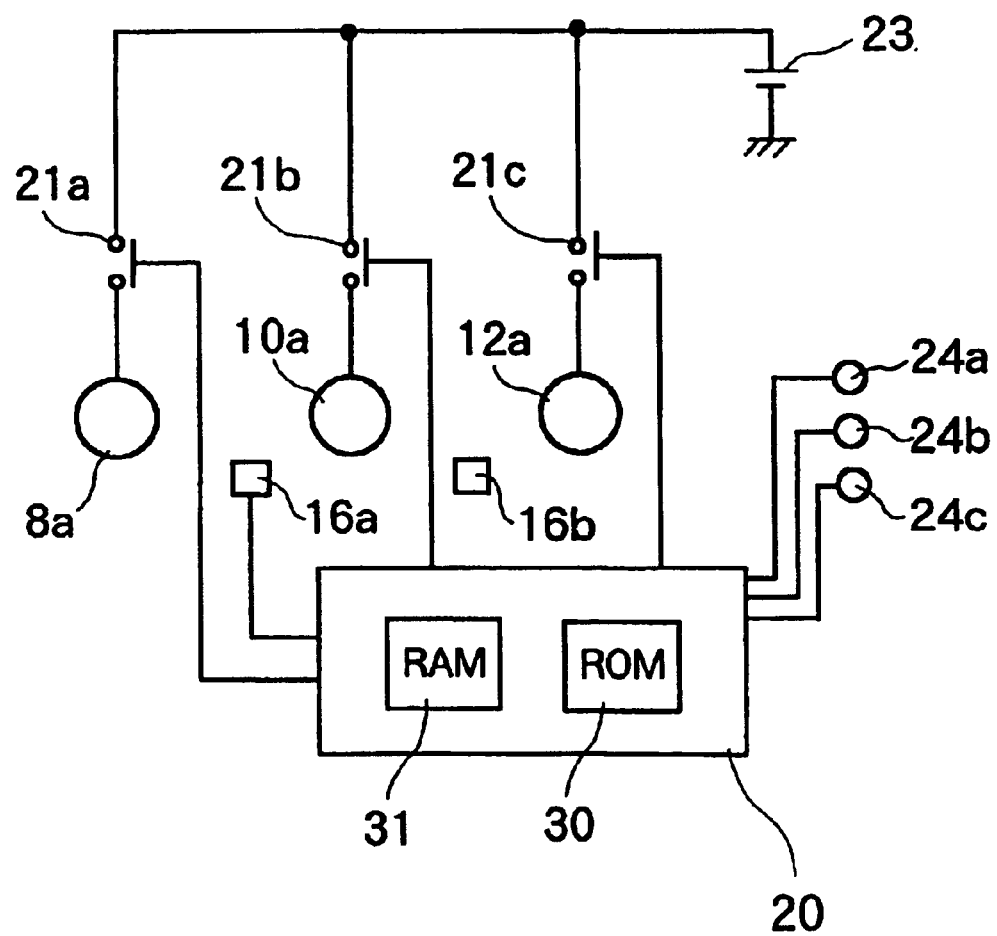
FIG. 4 is a block diagram showing the controller to be used in the seat shown in FIG. 1.

The controller 20 comprises, as shown in FIG. 4, a ROM 30 for storing the control program for controlling the position, so that a desired position can be obtained by executing arithmetic control according to the control program. The controller 20 includes a RAM 31 to be used as a working area for arithmetic control. The RAM 31 retains the inclining direction determination value and the stoppage determination value for the seatback 5, and the inclining direction determination value and the stoppage determination value for the leg rest 6 in the memory.

In the seat 1, when the changeover switch 24b for the reclined position is operated in the normal position M1, the seatback motor 8a and the leg rest motor 10a are operated simultaneously or with an appropriate time lag. By the operation of the seatback motor 8a the seatback 5 inclines backward, stops at the predetermined angle, and is supported in this situation. On the other hand, by the operation of the leg rest motor 10a, the leg rest 6 inclines upward, stops at the predetermined angle, and is supported in this situation. At this moment, the seat cushion 4 moves forward by a predetermined distance. When the inclining movement of the leg rest 6 in association with the inclining movement of the leg rest 6 reaches a prescribed angle, the footrest motor 12a is actuated, and the footrest 7 is pulled out from the leg rest 6 as shown in FIG. 1 in the inclined state, so that the feet (from about the knees to the toes) can be placed on the footrest 7. The operation described above makes the seat in the reclined position M2.

When the changeover switch 24c for the bed position is operated in the reclined position M2, the seatback motor 8a and the leg rest motor 10a are actuated simultaneously or with an appropriate time lag. By the operation of the seatback motor 8a the seatback 5 inclines backward, stops in the near horizontal position (the inclined state in which the distal end of the seatback is slightly higher than the proximal end thereof, and is supported in this state. On the other hand, by the operation of the leg rest motor 10a the leg rest 6 inclines upward, stops in the near horizontal position (the inclined state in which the side of the footrest 7 is slightly lower than the proximal end of the leg rest 6), and is supported in this state. When operated as described above, the seat takes the bed position M3.

When the changeover switch 24b for the reclined position is operated in the bed position M3, the respective parts are operated in near reverse order to the case where the changeover switch 24c for the bed position is operated in the reclined position M2, and the seat takes the reclined position M2.

When the changeover switch 24a for the normal position is operated in the reclined state M2, the respective parts are operated in near reverse order to the case where the changeover switch 24b for the reclined position is operated in the normal position M1, and the seat takes the normal position M1.

When the changeover switch 24c for the bed position is operated in the normal position M1, the procedures to be taken in a case where the changeover switch 24b for the reclined position is operated in the normal position M1, and in a case where the changeover switch 24c for the bed position is operated in the reclined position M2 are continuously performed, and the seat takes the bed position M3 via the reclined position M2.

When the changeover switch 24a for the normal position is operated in the bed position M3 in the same manner as described above, the respective parts are operated in the reverse order to the case where the changeover switch 24c for the bed position is operated in the normal position M1, and the seat takes the normal position M1 via the reclined position M2.

Depending on whether any switch from among the switches (the changeover switch 24a for the normal position, the changeover switch 24b for the reclined position, and the changeover switch 24c for the bed position) is operated in which position, the direction of rotation of the seatback motor 8a and thus the direction of pivotal movement of the seatback 5 (upward movement or downward movement) is determined, and the direction of rotation of the leg rest motor 10a(leg rest 6) and the direction of rotation (the direction of movement) of the footrest motor 12a (footrest 7) are determined in the same manner. The setting is made by the controller 20.

Figure 5:
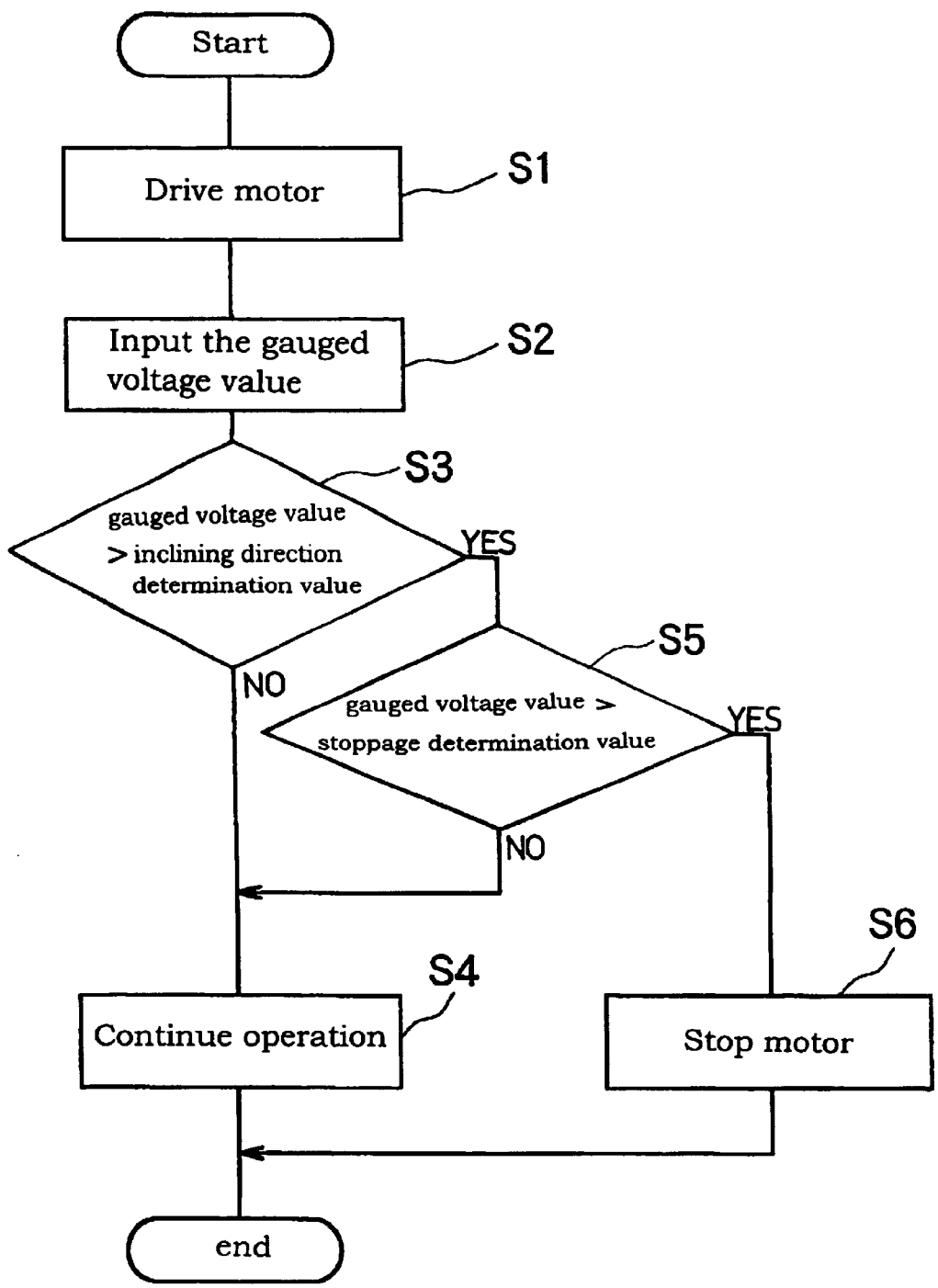
FIG. 5 is a flow chart showing a procedure for detecting the operations of the seatback and the leg rest by the seat controller shown in FIG. 1.

The controller 20 executes arithmetic and control by the use of the gauged voltage value of the seatback strain gauge 16a and the leg rest strain gauge 16b, and allows the motor to continue operation or to stop as shown in FIG. 5.

When any one of switches (the changeover switch 24a for the normal position, the changeover switch 24b for the reclined switch, and the changeover switch 24c for the bed position) is operated, the controller 20 keeps track of the direction of rotation of the respective motors (the seatback motor 8a the leg rest motor 10a and the footrest motor 12a) and the direction of the movement (direction of rotation or the direction of the forward and backward movement) of the seatback 5, the leg rest 6, and the footrest 7 depending on the positions (the normal position M1, the reclined position M2, and the bed position M3) of the seat at the moment when the switch is operated, which are stored in the RAM 31 prior to the operation of the switch, and on which switch was operated (Step S1). Simultaneously, the switch (the seatback switch 21a, the leg rest switch 21b, and the footrest switch 21c) corresponding to the motors to be operated (the seatback motor 8a the leg rest motor 10a and the footrest motor 12a) is closed to supply a current of an appropriate magnitude to the motor to be operated and actuate the seatback 5, the leg rest 6, or the footrest 7.

In Step S2 following Step S1, the controller 20 inputs the gauged voltage value of the seatback strain gauge 16a and the gauged voltage value of the leg rest strain gauge 16b.

Subsequently, the determination process of Step S3 and Step S4 are executed successively.

In Step S3, determination whether or not the gauged voltage value from the seatback strain gauge 16a is larger than the value for determining the direction of inclining movement for the seatback 5 and determination whether or not the gauged voltage value from the leg rest strain gauge 16b is larger than the value for determining the direction of the inclining movement for the leg rest 6. When the determination that the gauged voltage value is not larger than the inclining direction determination value is made for both of the gauged voltage values (the gauged voltage value from the seatback strain gauge 16a and the gauged voltage value from the leg rest strain gauge 16b) in step S3, it is determined to be NO, and goes to Step S4 to allow the seatback 5 and the leg rest 6 to continue operating.

When determination that the gauged voltage value is larger than the value for determining the direction of inclining movement is made for any one of the gauged voltage values (the gauged voltage value from the seatback strain gauge 16a and the gauged voltage value from the leg rest strain gauge 16b) (here, the case where the gauged voltage value from the leg rest strain gauge 16b is larger than the inclining direction determination value for the leg rest 6, and the gauged voltage value from the seatback strain gauge 16a is smaller than the inclining direction determination value for the seatback 5 is taken as an example) in Step S3, it is determined to be Yes, and goes to Step 5.

In step S5, whether or not the gauged voltage value from the leg rest strain gauge 16b is larger than the stoppage determination value for the leg rest 6 is determined.

When it is determined to be Yes (the gauged voltage value from the leg rest strain gauge 16b is larger than the stoppage determination value for the leg rest 6) in Step S5, it goes to Step S6 and opens the switch to stop the operation of the respective motors.

When it is determined to be NO (the gauged voltage value from the leg rest strain gauge 16b is lower than the stoppage determination value of the leg rest 6) in the step S5, it goes to Step S4 to allow the seatback 5 and the leg rest 6 to continue operating.

In the seat 1 constructed as described above, when the baggage B1 is placed in the leg rest operating space 40 with the seat in the bed position M3 as shown by a chain double-dashed line in FIG. 1, and the changeover switch 24b for the reclined position or the changeover switch 24a for the normal position is operated in this position, the leg rest 6 pivots downward (counterclockwise in FIG. 1). Then, when the leg rest 6 abuts against the baggage B1 before it reaches the reclined position M2, the leg rest 6 is applied with a reaction force (a force in the direction opposite to the direction of the inclining movement of the leg rest 6) from the baggage B1, and warps to form a concave on the upper surface with the proximal end (no sign is designated) as a pivot. Therefore, the portion where the gauge is mounted expands, and the gauged voltage value from the leg rest stain gauge 16b increases and exceeds the inclining direction determination value (determined as Yes in Step S3).

Then, when the driving force of the leg rest motor 10a further acts upon the leg rest 6 to further increase the gauged voltage value from the leg rest strain gauge 16b and exceeds the stoppage determination value, the switch (the seatback switch 21a, the leg rest switch 21b, and the footrest switch 21c) is opened to stop the operation of the respective motors (the seatback motor 8a the leg rest motor 10a and the footrest motor 12a) (Step S6) to stop the downward pivotal movement of the leg rest 6. Therefore, the leg rest 6 is prevented from pressurizing the baggage B1 unnecessarily and thus the baggage B1 is prevented from being damaged.

In the embodiment described above, the case where the leg rest 6 pivots downwardly is taken as an example. In the same manner, the same determination and control can be performed in a case where the seatback 5 pivots downwardly as well. In other words, as shown in FIG. 1 in chain double-dashed line, when the changeover switch 24b for the reclined position or the changeover switch 24c for the bed position is operated with the baggage B2 placed in the seatback operating space 41, the seatback 5 pivots downward. When the seatback 5 abuts against the baggage B2, the seatback is applied with a reaction force (a force in the direction opposite to the direction of the inclining movement of the seatback 5) and warp to form a concave on the upper surface with the proximal side 5k as a pivot. Therefore, the portion where the gauge is mounted 5m expands, and the gauged voltage value from the seatback strain gauge 16a increases and exceeds the inclining direction determination value (it is determined to be Yes in Step S3).

When the gauged voltage value from the seatback strain gauge 16a further increases and exceeds the stoppage determination value, the switch is opened to stop the respective motors (the seatback motor 8a the leg rest motor 10a and the motor foot rest 12a) (Step S6) to stop the downward pivotal movement of the leg rest 6. Therefore, the seatback 5 is prevented from pressurizing the baggage B2 unnecessarily and thus the baggage B2 is prevented from being damaged.

Though the case where the operation of three motors (the seatback motor 8a the leg rest motor 10a and the footrest motor 12a) are stopped when it is determined to be Yes in Step 5 is taken as an example in the embodiment described above (Step S6), it is also possible to construct in such a manner that only the corresponding motor (for example, the seatback motor 8a) is stopped because the seatback motor 8a the leg rest motor 10a and the footrest motor 12a are operated independently.

In the embodiment described above, it is also possible to provide alarm means for alarming that it is determined to be Yes in Step S5 (when the gauged voltage value from the leg rest strain gauge 16b is larger than the stoppage determination value for the leg rest 6, or when the gauged voltage value from the seatback strain gauge 16a is larger than the stoppage determination value for the seatback 5) by a voice or a lamp, when it is so. In this arrangement, the seated person or the passenger can be notified quickly in case a malfunction occurs.

In the embodiment described above, the case where the seatback strain gauge 16a is provided on the back side of the seatback frame 5a is taken as an example. Alternatively, it is also possible to provide the same on the front side of the seatback frame 5a. The same thing can be said for the leg rest strain gauge 16b.

Though the case where the seat 1 is installed in the first-class cabin of the aircraft is taken as an example in the embodiment described above, the present invention is not limited thereto, but it may be applied to the vehicles such as a railway vehicle or a bus, or in the hospital or various facilities as a bed for the aged person or the handicapped person.

According to the present invention, since the strain gauge detects a force that acts on the frame in the direction opposite to the direction of the inclining movement when the frame is inclined downward, the fact that an item is placed in the operating range of the frame can be anticipated, and thus it can be prevented that the item placed in the operating range is further pressed.

According to the present invention, when the force that the strain gauge detected is larger than the predetermined reference value, at least one of the seatback and the leg rest, which is provided with the strain gauge, is stopped operating. Therefore an unnecessary force is prevented from being applied by at least one of them, thereby preventing damage of the property or the like.

According to the present invention, when a force that the strain gauge detected is larger than the predetermined reference value, the alarm means alarms that a significant force is applied to at least one of the seatback and the leg rest, which is provided with the strain gauge. Therefore, the seated person can quickly be notified that an unnecessary force may be applied to other members.

What is claimed is:

1. A seat, comprising:

a seatback and a leg rest supported by a seat cushion for pivotal movement;

driving means for driving the seatback and the leg rest;

a strain gauge provided directly on a back surface on the proximal side of a frame in the seatback and in the leg rest for detecting, during an inclining movement, a force that acts on the frame in a direction opposite to a direction of the inclining movement, and an operation-stopping means instantly ceasing a pivotal movement of at least one of the seatback and the leg rest not damaging obstacles thereunder when a force acting on the strain gauge as well as a force acting on the area of the seatback or the leg rest detected by the strain gauge are larger than a predetermined reference value.

2. The seat as set forth in claim 1, further comprising alarm means for alarming that a large force is applied on at least one of the seatback and the leg rest, which is provided with the strain gauge therein, when the force that the strain gauge detected is larger than a predetermined reference value.

* * * * *